(12) United States Patent
Jeong et al.

(10) Patent No.: US 10,908,568 B2
(45) Date of Patent: Feb. 2, 2021

(54) ELECTRONIC DEVICE FOR CONTROLLING IOT DEVICE TO CORRESPOND TO STATE OF EXTERNAL ELECTRONIC DEVICE AND OPERATION METHOD THEREOF

(71) Applicant: Samsung Electronics Co., Ltd, Suwon-si (KR)

(72) Inventors: Jin Hong Jeong, Yongin-si (KR); Chan Woo Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 16/163,397

(22) Filed: Oct. 17, 2018

(65) Prior Publication Data

US 2019/0113899 A1   Apr. 18, 2019

(30) Foreign Application Priority Data

Oct. 17, 2017 (KR) .................. 10-2017-0134798

(51) Int. Cl.
*G05B 15/02* (2006.01)
*H04L 29/08* (2006.01)
(Continued)

(52) U.S. Cl.
CPC .............. *G05B 15/02* (2013.01); *G16Y 40/35* (2020.01); *H04L 12/2818* (2013.01);
(Continued)

(58) Field of Classification Search
None
See application file for complete search history.

(56) References Cited

U.S. PATENT DOCUMENTS 9,503,969 B1   11/2016   Zakaria
9,733,975 B2   8/2017   Cook et al.
(Continued)

FOREIGN PATENT DOCUMENTS

KR   20-2010-0006636 U   7/2010
KR   10-2017-0006120 A   1/2017

OTHER PUBLICATIONS

Communication pursuant to Article 94(3) EPC dated Nov. 4, 2019 in connection with European Patent Application No. 18 200 589.2, 9 pages.

(Continued)

*Primary Examiner* — Sean Shechtman

(57) ABSTRACT

An electronic device and an operation method of the electronic device are disclosed. The electronic device includes a communication module, a memory and a processor. The communication module is configured to communicate with a communication relay. The memory is configured to store registration information of at least one IoT device and scenario information associated with operating an operation state of at least one registered IoT device according to information associated with an unregistered external electronic device. The processor is configured to receive the information associated with the unregistered external electronic device via the communication relay. The processor is also configured to select the scenario information corresponding to the information. The processor is also configured to transmit a control command corresponding to the scenario information to at least some IoT devices corresponding to the scenario information among the at least one registered IoT device depending on the scenario information.

18 Claims, 15 Drawing Sheets

(51) Int. Cl.
*H04W 4/70* (2018.01)
*G16Y 40/35* (2020.01)
*H04L 12/28* (2006.01)

(52) U.S. Cl.
CPC .......... *H04L 67/125* (2013.01); *H04L 67/303* (2013.01); *H04W 4/70* (2018.02); *G05B 2219/23269* (2013.01)

(56) References Cited

U.S. PATENT DOCUMENTS

| | | |
|---|---|---|
| 2007/0137988 A1 | 6/2007 | Yu et al. |
| 2013/0191755 A1 | 7/2013 | Balog et al. |
| 2015/0019714 A1 | 1/2015 | Shaashua et al. |
| 2016/0105814 A1 | 4/2016 | Hurst et al. |

OTHER PUBLICATIONS

European Search Report dated Mar. 4, 2019 in connection with European Patent Application No. 18 20 0589, 10 pages.

ELECTRONIC DEVICE FOR CONTROLLING IOT DEVICE TO CORRESPOND TO STATE OF EXTERNAL ELECTRONIC DEVICE AND OPERATION METHOD THEREOF

CROSS-REFERENCE TO RELATED APPLICATION

This application is based on and claims priority under 35 U.S.C. § 119 to Korean Patent Application No. 10-2017-0134798 filed on Oct. 17, 2017 in the Korean Intellectual Property Office, the disclosure of which is incorporated by reference herein its entirety.

BACKGROUND

1. Field

The present disclosure relates to automation implementation technologies using the Internet of things (IoT).

2. Description of Related Art

Recently, technologies associated with the IoT have drawn attention. The IoT may include the concept of communicating between a thing and a thing or between a thing (hereinafter referred to as "IoT device") and a person.

An IoT device may communicate with another IoT device through an IoT server (e.g., a platform server) and may communicate using a protocol (hereinafter referred to as "specified protocol") of the same version as the IoT server. Thus, the IoT device or the IoT server may communicate between, for example, devices, each of which uses a protocol of the same version developed by one or more manufacturers.

Furthermore, after the IoT device should be registered with the IoT server or an IoT hub device, it may be monitored or controlled through the IoT server or the IoT hub device. For the IoT device to be registered may include, for example, a procedure where information (e.g., an internet protocol (IP) address and identification information) of the IoT device is manually or automatically registered with the IoT server or the IoT hub device.

The above information is presented as background information only to assist with an understanding of the present disclosure. No determination has been made, and no assertion is made, as to whether any of the above might be applicable as prior art with regard to the present disclosure.

SUMMARY

As such, a conventional IoT device may fail to use an IoT server and a specified protocol or may fail to provide a function of monitoring or controlling a device which is not registered with the IoT server although using the IoT server and the specified protocol.

Aspects of the present disclosure are to address at least the above-mentioned problems and/or disadvantages and to provide at least the advantages described below. Accordingly, an aspect of the present disclosure is to provide an electronic device for controlling an IoT device to correspond to a state of an external electronic device which is not registered with a server device without using the server device and a specified protocol and an operation method thereof.

In accordance with an aspect of the present disclosure, an electronic device is provided. The electronic device may include a communication module configured to communicate with a communication relay, a memory storing registration information of at least one Internet of things (IoT) device and scenario information associated with operating an operation state of at least one registered IoT device according to information associated with an unregistered external electronic device, and a processor configured to be electrically connected with the communication module and the memory. The memory may store instructions, when executed, causing the processor to receive the information associated with the external electronic device via the communication relay, select scenario information corresponding to the information associated with the external electronic device, and transmit a control command corresponding to the scenario information to at least some IoT devices corresponding to the scenario information among the at least one IoT device depending on the scenario information.

In accordance with another aspect of the present disclosure, an operation method of an electronic device is provided. The operation method of the electronic device including a communication module configured to communicate with a communication relay and a memory storing registration information of at least one IoT device and scenario information associated with operating an operation state of at least one registered IoT device according to information associated with an unregistered external electronic device may include receiving the information associated with the external electronic device via the communication relay, selecting scenario information corresponding to the information associated with the external electronic device, and transmitting a control command corresponding to the scenario information to at least some IoT devices corresponding to the scenario information among the at least one IoT device depending on the scenario information.

According to embodiments disclosed in the present disclosure, the state of an external electronic device which is not registered for IoT communication may be verified.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
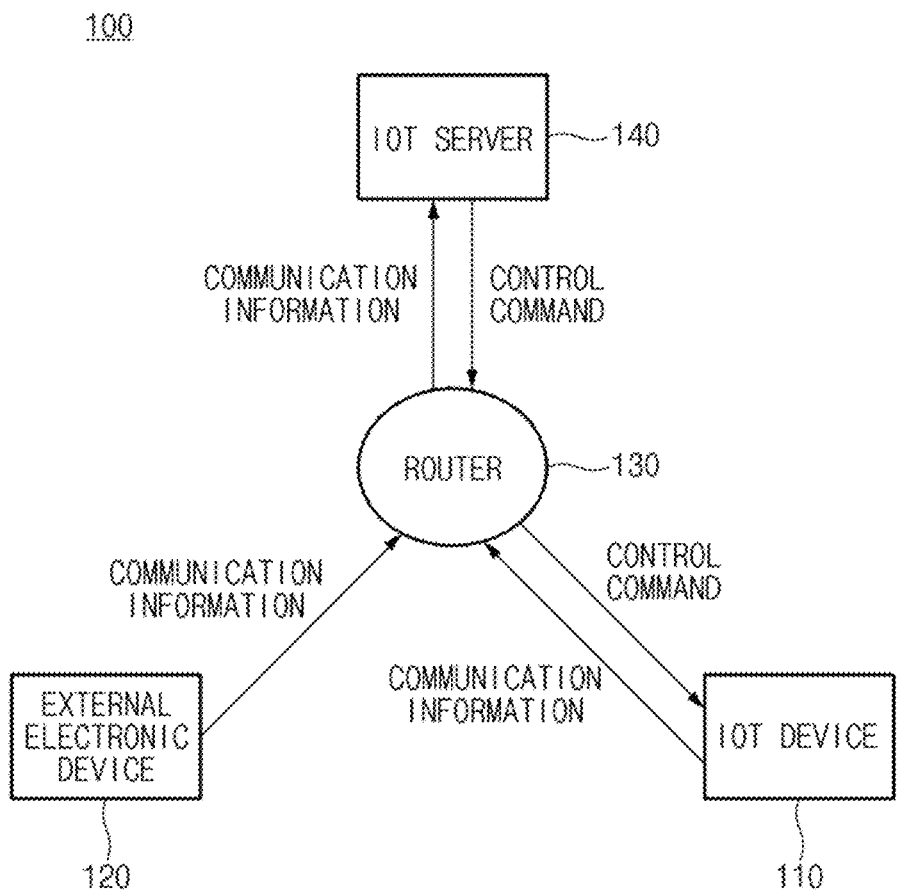
FIG. 1 illustrates a drawing depicting a configuration of an IoT system in a process of using an IoT service according to an embodiment.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

In the present disclosure, according to the situation, the expression "adapted to or configured to" used herein may be interchangeably used with, for example, the expression "suitable for", "having the capacity to", "changed to", "made to", "capable of" "designed to", or "adapted to". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., SAMSUNG HOMESYNC, APPLE TV, or GOOGLE TV), a game console (e.g., XBOX or PLAYSTATION), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MM), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates a drawing depicting a configuration of an IoT system in a process of using an IoT service according to an embodiment.

Referring to FIG. 1, according to an embodiment, an IoT system 100 may include an IoT device 110, an external electronic device 120, a router 130, and an IoT server 140 (e.g., a cloud server). In an embodiment, the IoT system 100 may fail to include some of the components or may further include other component(s). For example, the IoT system 100 may include a plurality of IoT devices. In an embodiment, some of the components of the IoT system 100 may be combined with each other to be configured as one entity. The IoT system 100 may perform functions of the components before the combination in the same manner. The input and output relationship shown in FIG. 1 may be, but is not limited to, only an example for convenience of description.

According to an embodiment, the IoT system 100 may communicate with the IoT server 140 via the router 130. The IoT device 110 may be a device which uses the same specified protocol (e.g., the same promised protocol) as the IoT server 140 and is registered for IoT communication with the IoT server 140. Being registered for the IoT communication may refer to communicating using, for example, a specified protocol (the same version and the same standard) through an app after the app for the IoT communication is installed. For another example, being registered for the IoT communication may mean that an internet protocol (IP) address and identification information for IoT communication of the IoT device 110 are registered with the IoT server 140. For another example, being registered for the IoT communication may include reporting a state of the IoT device 110 to the IoT server 140 through a specified protocol periodically or depending on occurrence of an event or receiving a command to perform a specified operation from the IoT server 140 and performing the specified operation.

The IoT device 110 may include, for example, household appliances (e.g., a light and a heating and cooling device), a monitoring device (e.g., a security camera), a portable communication device (e.g., a smartphone), a wearable device, or the like.

According to an embodiment, the external electronic device 120 may correspond to at least one of a device which uses a protocol different from the IoT server 140 or a device which is not registered for IoT communication with the IoT server 140. The external electronic device 120 may be, for example, a device which is registered with the IoT server 140 as a monitoring target for controlling the IoT device 110. Being registered as the monitoring target may mean that, for example, identification information of the external electronic device 120 and a scenario for IoT control, corresponding to a state to be monitored for the external electronic device 120 are stored in the IoT server 140. For example, the external electronic device 120 may be a device manufactured by a manufacturer different from the IoT server 140.

The external electronic device 120 may be each of various types of devices. The external electronic device 120 may include at least one of, for example, a portable communication device (e.g., a smartphone), a computer device, a portable multimedia device, a portable medical device, a camera (e.g., a security camera), a wearable device, household appliances, a game console, or a media device (e.g., a television (TV)).

According to an embodiment, the router 130 may relay communication between the IoT device 110 and the IoT server 140. The router 130 may communicate with the IoT device 110 in a specified communication mode and may communicate with the IoT server 140 in another communication mode. The specified communication mode may be the same as or different from the other communication mode. The specified communication mode and the other communication mode may include at least one of Wireless Local Area Network (WLAN) mode, for example, Wi-Fi mode or Zigbee mode, short range communication mode, for example, bluetooth communication mode, and cellular communication mode, for example, Long Term Evolution (LTE) mode and 5G mode, and the like, respectively. For example, when receiving a signal of the specific communication mode from the IoT device 110, the router 130 may convert the received signal into a signal of another communication mode and may transmit the converted signal to the IoT server 140. For another example, when receiving a signal of another communication mode from the IoT server 140, the router 130 may convert the received signal into a signal of the specified communication mode and may transmit the converted signal to the IoT device 110.

According to an embodiment, when the external electronic device 120 accesses the router 130, the router 130 may collect information associated with the external electronic device 120. The information associated with the external electronic device 120 may include at least one of, for example, identification information (e.g., a medium access control (MAC) address) of the external electronic device 120, information about access or non-access of the external electronic device 120, information about an access time of the external electronic device 120, information about data usage of the external electronic device 120, information about a data type of the external electronic device 120, information about a service which is in use by the external electronic device 120, information about a space (e.g., a room) where the external electronic device 120 is located, information about a type (e.g., a camera, a TV, a refrigerator, a phone, a game console, or the like) of the external electronic device 120, or information about a communication pattern of the external electronic device 120.

According to an embodiment, the router 130 may classify a device category (e.g., a phone, a game console, or the like) of the external electronic device 120 based on the identification information (e.g., the MAC address) of the external electronic device 120. For example, the router 130 may classify the device category of the external electronic device 120 by verifying a device category corresponding to the identification information of the external electronic device 120 from a specified DB and determining the verified device category as the device category of the external electronic device 120.

According to an embodiment, the router 130 may transmit the collected information associated with the external electronic device 120 to the IoT server 140. For example, the router 130 may transmit information associated with the external electronic device 120 at a specified period. For another example, when a new electronic device accesses the router 130, the router 130 may transmit information associated with the new electronic device.

According to an embodiment, the IoT server 140 may monitor a state of the external electronic device 120 based on the information associated with the external electronic device 120. The IoT server 140 may determine a state of the external electronic device 120 based on the information associated with the external electronic device 120 and may execute a scenario in response to the state of the external electronic device 120. The IoT server 140 may transmit a control command to at least some of IoT devices corresponding to the scenario among the at least one IoT device 110 depending on the execution of the scenario. A description will be given below of an embodiment in which the IoT server 140 executes a scenario in response to a state of the external electronic device 120.

The IoT server 140 may be each of various types of devices. The IoT server 140 may be, for example, a cloud server, a specific service server, or a computer device. Alternatively, the IoT server 140 may include at least one of a portable communication device (e.g., a smartphone), a portable multimedia device, a portable medical device, a camera, a wearable device, or household appliances. The IoT server 140 according to an embodiment of the present disclosure is not limited to the above-mentioned devices.

The above-mentioned embodiment is exemplified as the router 130 collects the information about the external electronic device 120 and transmits the collected information to the IoT server 140. However, embodiments are not limited thereto. For example, the router 130 may perform at least some functions of the IoT server 140. For example, the router 130 may determine a state of the external electronic device 120 based on information associated with the external electronic device 120 and may transmit information about the determined state of the external electronic device 120 to the IoT server 140. In this case, the IoT server 140 may verify a scenario corresponding to the state of the external electronic device 120 and may execute the scenario. For another example, the router 130 may replace all functions of the IoT server 140.

In contrast to the above-mentioned embodiment, the external electronic device 120 may set a scenario for the IoT device 110 using a specified user interface (UI) platform provided from the IoT server 140. Additionally or alternatively, the IoT system 100 may further include another electronic device (e.g., a smartphone). The other electronic device may set a scenario for the IoT device 110 using the specified UI platform.

The above-mentioned embodiment is exemplified as the router 130 relays communication between the IoT server 140 and the external electronic device 120 and between the IoT server 140 and the IoT device 110. However, embodiments are not limited thereto. For example, the router 130 may be replaced with another communication relay including an access point (AP).

The IoT server 140 according to an embodiment may monitor a state of the external electronic device 120 which is not registered for IoT communication with a server. Furthermore, the IoT server 140 according to an embodiment may use a state of the external electronic device 120 to control the IoT device 110.

Figure 2:
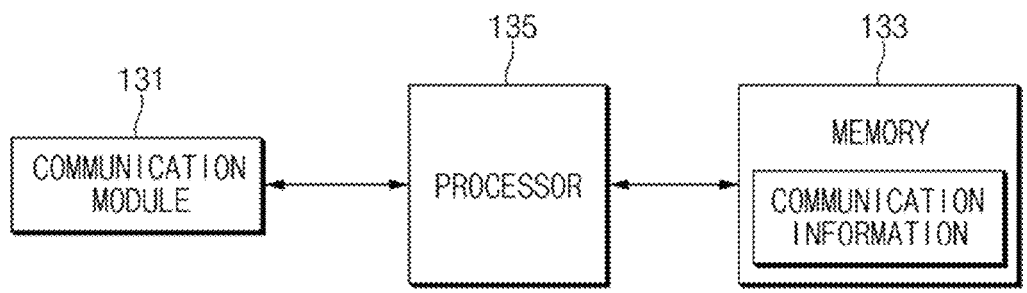
FIG. 2 illustrates a block diagram depicting a configuration of a router (e.g., a router 130 of FIG. 1) according to an embodiment.

FIG. 2 illustrates a block diagram depicting a configuration of a router (e.g., a router 130 of FIG. 1) according to an embodiment.

Referring to FIG. 2, according to an embodiment, the router 130 may include a communication module 131, a memory 133, and a processor 135. In an embodiment, the router 130 may fail to include some of the components or may further include other component(s). In an embodiment, some of the components of the router 130 may be combined with each other to be configured as one entity. The router 130 may perform functions of the components before the combination in the same manner. The input and output relationship shown in FIG. 2 may be, but is not limited to, only an example for convenience of description.

According to an embodiment, the communication module 131 may establish a communication channel of a specified communication mode and a communication channel of another communication mode. For example, when receiving data of the specified communication mode over a specified communication channel, the communication module 131 may convert the data of the specified communication mode into data of another communication mode based on instructions of the processor 135 and may transmit the converted data over another communication channel. Furthermore, when receiving data of the other communication mode over the other communication channel, the communication module 131 may convert the data of the other communication mode into data of the specified communication mode depending on instructions of the processor 135 and may transmit the converted data over the specified communication channel.

The memory 133 may be a volatile memory (e.g., a random access memory (RAM) or the like), a nonvolatile memory (e.g., a read only memory (ROM), a flash memory, or the like), or a combination thereof. The memory 133 may store, for example, instructions or data associated with at least one other element(s) of the router 130. According to an embodiment, the memory 133 may store information associated with an external electronic device 120 which accesses the router 130, based on instructions of the processor 135. The information associated with the external electronic device 120 may include at least one of, for example, identification information of the external electronic device 120, information about access or non-access of the external electronic device 120, information about an access time of the external electronic device 120, information about data usage of the external electronic device 120, information about a data type of the external electronic device 120, information about a service which is in use by the external electronic device 120, information about a space (e.g., a room) where the external electronic device 120 is located, or information about a communication pattern of the external electronic device 120. The identification information of the external electronic device 120 may include at least one of, for example, a MAC address of the external electronic device 120, information about a name of the external electronic device 120, information about a type of the external electronic device 120, or information about a manufacturer of the external electronic device 120. The information about the access or non-access of the external electronic device 120 may include information about whether the external electronic device 120 accesses the router 130. The information about the access time of the external electronic device 120 may include at least one of, for example, an access time when the external electronic device 120 accesses the router 130 or an access end time when access between the external electronic device 120 and the router 130 is ended. The information about the type of the external electronic device 120 may be, for example, information indicating whether data downloaded or uploaded by the external electronic device 120 is any of a video or an audio.

The processor 135 may include at least one of, for example, a central processing unit (CPU), a graphic processing unit (GPU), a microprocessor, an application processor, an application specific integrated circuit (ASIC), or field programmable gate arrays (FPGA) and may have a plurality of cores. The processor 135 may execute an arithmetic operation or data processing associated with control and/or communication of at least one other component(s) of the router 130.

According to an embodiment, when the external electronic device 120 accesses the router 130, the processor 135 may collect and store information associated with the external electronic device 120. For example, the processor 135 may verify identification information of the external electronic device 120 which accesses the router 130. For example, the processor 135 may monitor total data usage from an access time of the external electronic device 120 to an access end time of the external electronic device 120. The information about the data usage of the external electronic device 120 may include at least one of information indicating whether to use data, information about upload data usage, or information about download data usage. For another example, the processor 135 may determine information about a room where the external electronic device 120 is located, using a separation distance between the router 130 and another router (not shown), a first distance between the router 130 and the external electronic device 120, and a second distance between the other router (not shown) and the external electronic device 120, for example, using a triangulation. To this end, the processor 135 may need a preceding process of verifying information about the entire space (e.g., the entire space of hotel A) which is communicable using the router 130 and another router and information about a space (e.g., each room of hotel A) which is separated from the entire space. For another example, the processor 135 may verify at least one of information about a time pattern or information about a space pattern, in which the external electronic device 120 uses data, as communication pattern information.

Figure 3:
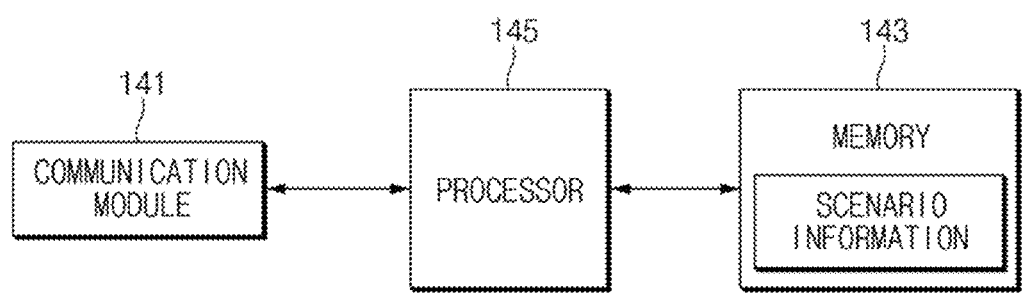
FIG. 3 illustrates a block diagram depicting a configuration of an IoT server (e.g., an IoT server 140 of FIG. 1) according to an embodiment.

FIG. 3 illustrates a block diagram depicting a configuration of an IoT server (e.g., an IoT server 140 of FIG. 1) according to an embodiment.

Referring to FIG. 3, according to an embodiment, the IoT server 140 may include a communication module 141, a memory 143, and a processor 145. In an embodiment, the IoT server 140 may fail to include some of the components or may further include other component(s). In an embodiment, some of the components of the IoT server 140 may be combined with each other to be configured as one entity. The IoT server 140 may perform functions of the components before the combination in the same manner. The input and output relationship shown in FIG. 3 may be, but is not limited to, only an example for convenience of description.

According to an embodiment, the communication module 141 may establish another communication channel for another communication mode (e.g., a LAN, long term evolution (LTE), or the like). For example, the communication module 141 may convert data of the other communication mode into data analyzable by the processor 145. Furthermore, the communication module 141 may convert data from the processor 145 into data of the other communication mode. For another example, the communication module 141 may transmit and receive data of the other communication mode over another communication channel.

The memory 143 may be a volatile memory (e.g., a RAM or the like), a nonvolatile memory (e.g., a ROM, a flash memory, or the like), or a combination thereof. The memory 143 may store instructions or data associated with at least one other element(s) of the IoT server 140. The instructions, when executed, may cause the processor 145 to execute processing corresponding to each of the instructions. According to an embodiment, the memory 143 may store registration information of at least one IoT device 110 of FIG. 1 and scenario information associated with operating an operation state of at least one registered IoT device according to information associated with an external electronic device which is not registered. The scenario information may include at least one of, for example, identification information of an external electronic device 120 of FIG. 1, information of the at least some IoT devices to be controlled, or a control command to be transmitted to the at least some IoT devices.

The scenario information may include, for example, scenario A of turning on a specific light (e.g., an IoT device 110 of FIG. 1) when a specified external electronic device (e.g., the external electronic device 120 of FIG. 1 or another electronic device) accesses a router (e.g., a router 130 of FIG. 1). The scenario information may include, for example, scenario B of providing profile information for communicating with the router 130 to a client terminal when the client terminal (e.g., the external electronic device 120 of FIG. 1) reserves specified lodging (e.g., lodging where a router 130 of FIG. 1 is installed) through a specified site, determining that a client checks in at the reserved lodging when the client terminal accesses the router 130, and driving various devices (e.g., the IoT device 110 of FIG. 1) (e.g., a light, a heating and cooling device, and the like) installed in the lodging. The scenario information may include, for example, scenario C of changing and setting an image quality component of a display device (e.g., the IoT device 110 of FIG. 1) connected with a game console (e.g., the external electronic device 120 of FIG. 1) to, for example, a game mode, when verifying the use of data of the game console through the router 130. The scenario information may include, for example, scenario D of verifying whether a monitoring device (e.g., the external electronic device of FIG. 1) is turned off based on the use of data of the monitoring device which needs a continuous connection to the router 130 and warning of abnormality of the monitoring device through a speaker (e.g., the IoT device 110 of FIG. 1) when verifying that the monitoring device is turned off. The scenario information may include, for example, scenario E of accumulating and storing information associated with the external electronic device 120, verifying (or learning) a pattern of a state change of the IoT device 110 according to a state change of the external electronic device 120 based on the information associated with the external electronic device 120, determining scenario information corresponding to the verified pattern, and storing the determined scenario information in the memory 143. The scenario information may include, for example, scenario F of monitoring time to use a specified service (e.g., the Internet, a game, or the like) through a PC (e.g., the external electronic device 120 of FIG. 1) through the router 130 and blocking the use of the specified service or warning of a limit to the use of the specified service when the time to use the specified service is greater than or equal to a specified limited time.

The processor 145 may include at least one of, for example, a CPU, a GPU, a microprocessor, an application processor, an ASIC, or FPGA and may have a plurality of cores. The processor 145 may execute an arithmetic operation or data processing associated with control and/or communication of at least one other component(s) of the IoT server 140. For example, the processor 145 may execute processing according to embodiments described below, based on instructions stored in the memory 143.

According to an embodiment, the processor 145 may receive information associated with the external electronic device 120 via the communication module 141 and may determine a state of the external electronic device 120 based on the information associated with the external electronic device 120. The processor 145 may select scenario information corresponding to identification information of the external electronic device 120 from scenario information stored in the memory 143. The processor 145 may transmit a control command corresponding to verified scenario information to at least some IoT devices corresponding to the verified scenario information among at least one IoT device 110 depending on the selected scenario information. To this end, the processor 145 may obtain identification information of the external electronic device 120 before the external electronic device 120 accesses the router 130 and may associate and store the identification information of the external electronic device 120 with scenario information corresponding to the external electronic device 120.

According to an embodiment, when verifying that the external electronic device 120 accesses the router 130 using the information associated with the external electronic device 120, the processor 145 may transmit a control command to turn on at least some IoT devices to the at least some IoT devices depending on scenario A.

According to an embodiment, the external electronic device 120 may include a game console, and the at least one IoT device 110 may include a display device. In this case, when the game console is connected to the router 130 (or the IoT server 140), the processor 145 may transmit a control command to change an image quality component of the display device to a game mode to the display device depending on scenario C.

According to an embodiment, the external electronic device 120 may include a monitoring device which needs a continuous connection to the router 130, and the at least one IoT device 110 may include an output device. In this case, when the monitoring device ends a connection with the router 130, the processor 145 may transmit a control command to warn of abnormality of the monitoring device to the output device depending on scenario D.

According to an embodiment, the processor 145 may accumulate and store the information associated with the external electronic device 120 and may verify (learn) a pattern of a state change of the IoT device 110 according to a state change of the external electronic device 120 based on the information associated with the external electronic device 120. The processor 145 may determine scenario information corresponding to the verified pattern and may store the determined scenario information in the memory 143.

According to an embodiment, the processor 145 may verify time to use a specified online service of the external electronic device 120. When the time to use the specified online service is greater than or equal to a specified limited time, the processor 145 may transmit a control command for at least some IoT devices to output a sentence for requesting to limit the use of the online service to the at least some IoT devices depending on scenario F.

According to an embodiment, the processor 145 may verify time to use the specified online service of the external electronic device 120. When the time to use the specified online service is greater than or equal to the specified limited time, the processor 145 may transmit a control command to limit the use of a communication network for the external electronic device 120 or the at least some IoT devices 110 to the router 130 depending on scenario F.

According to an embodiment, the processor 145 may provide a user interface (UI) for setting the scenario information to the external electronic device 120 via the communication module 141 and may store the scenario information set through the UI in the memory 143.

Figure 4:
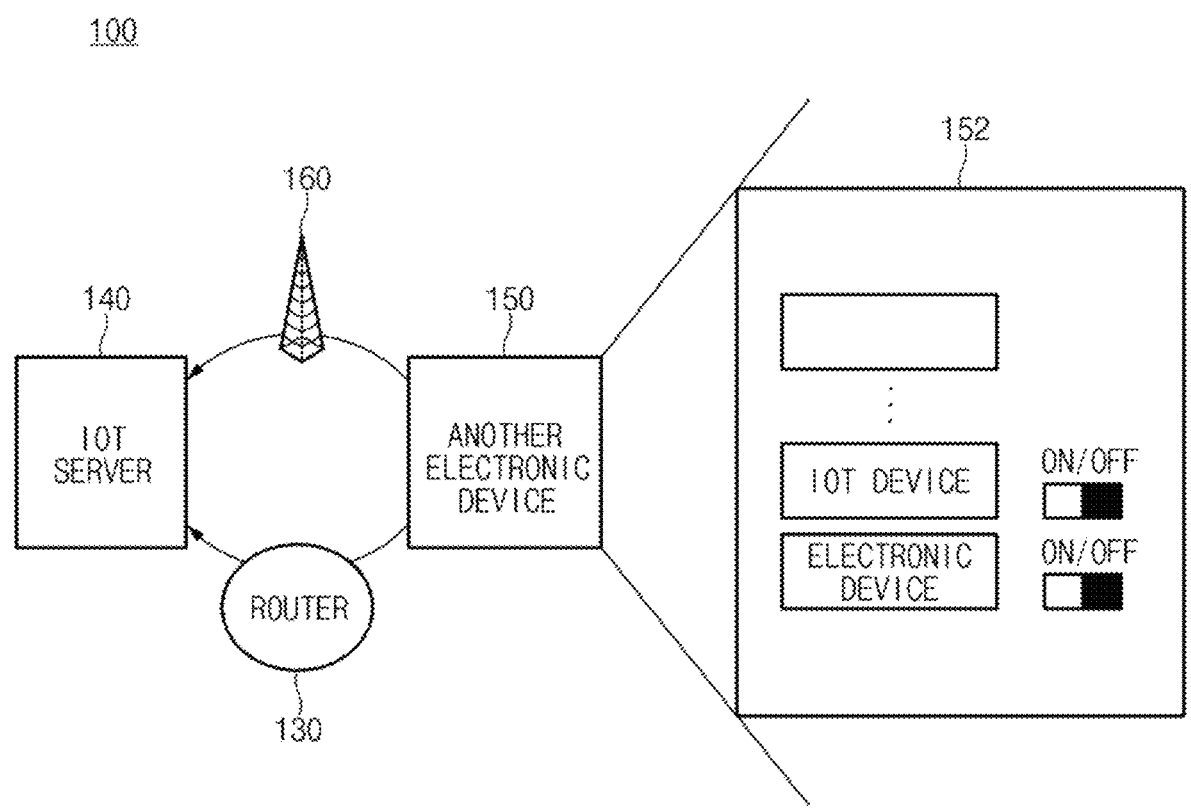
FIG. 4 illustrates a configuration of an IoT system in a process of setting an IoT service according to an embodiment.

FIG. 4 illustrates a configuration of an IoT system in a process of setting an IoT service according to an embodiment. FIG. 4 is a drawing illustrating a configuration of an IoT system in a process of setting a scenario for an IoT device.

Referring to FIG. 4, according to an embodiment, an IoT system 100 may include a router (e.g., a router 130 of FIG. 1), a base station device 160, an IoT server (e.g., an IoT server 140 of FIG. 1), and another electronic device 150. The other electronic device 150 may be the same device as an external electronic device (e.g., an external electronic device 120 of FIG. 1) or may be a device independent of the external electronic device 120.

According to an embodiment, each of the router 130 and the base station device3 160 may relay communication between the other electronic device 150 and the IoT server 140. For example, when the other electronic device 150 uses a specified communication mode, the router 130 may relay communication between the other electronic device 150 and the IoT server 140. For another example, when the other electronic device 150 uses another communication mode (e.g., a LAN, LTE, or the like), the base station device 160 corresponding to the other communication mode may relay communication between the other electronic device 150 and the IoT server 140.

According to an embodiment, the IoT server 140 may provide information about an IoT device (e.g., an IoT device 110 of FIG. 1) and an electronic device (e.g., the external electronic device 120 of FIG. 1) to the other electronic device 150. For example, the IoT server 140 may provide a UI platform for setting a scenario to the external electronic device 120. Scenario information may include, for example, a scenario for controlling the IoT device 110 corresponding to a state of the external electronic device 120.

When the scenario is set through the UI platform, the IoT server 140 may store the set scenario in a memory (e.g., a memory 143 of FIG. 3). Thereafter, when verifying a state of the other electronic device 150 corresponding to the stored scenario, the IoT server 140 may transmit a control command to control the IoT device 110 corresponding to the set scenario depending on the stored scenario to the IoT device 110.

According to an embodiment, the other electronic device 150 may display a UI platform received from the IoT server 140 on a display 152. The UI platform may include at least one of a state (e.g., an On/Off state) of the external electronic device 120 to be monitored or a function of the IoT device 110 to be controlled. When verifying information about the scenario set through the UI platform, the external electronic device 120 may transmit the verified scenario information to the IoT server 140.

Figure 5:
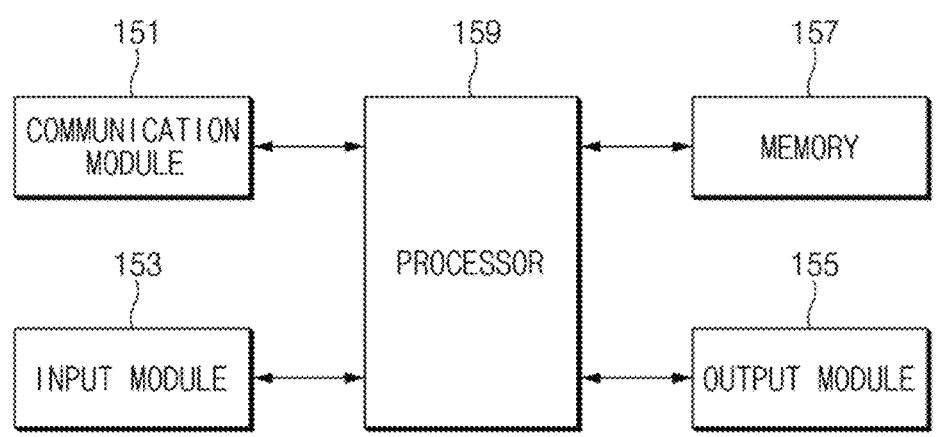
FIG. 5 illustrates a block diagram depicting a configuration of an electronic device (e.g., another electron device 150 of FIG. 4) according to an embodiment.

FIG. 5 illustrates a block diagram depicting a configuration of an electronic device (e.g., another electron device 150 of FIG. 4) according to an embodiment.

Referring to FIG. 5, the other electronic device 150 may include a communication module 151, an input module 153, an output module 155, a memory 157, and a processor 159. In an embodiment, the other electronic device 150 may fail to include some of the components or may further include other component(s). In an embodiment, some of the components of the other electronic device 150 may be combined with each other to be configured as one entity. The other electronic device 150 may perform functions of the components before the combination in the same manner. The input and output relationship shown in FIG. 5 may be, but is not limited to, only an example for convenience of description.

According to an embodiment, the communication module 151 may establish a specified communication channel for a specified communication mode (e.g., Wi-Fi). For example, the communication module 151 may convert data of the specified communication mode into data analyzable by the processor 159. Furthermore, the communication module 151 may convert data from the processor 159 into data of the specified communication mode. For example, the communication module 151 may transmit and receive data of the specified communication mode over the specified communication channel.

According to an embodiment, the output module 155 may display a UI platform received from an IoT server 140 of FIG. 4 via the communication module 151 depending on instructions of the processor 159. The UI platform may include at least one of a state (e.g., an On/Off state) of an external electronic device 120 to be monitored or a function of an IoT device 110 to be controlled. The output module 155 may include at least one of, for example, a display similar to the display 152 of FIG. 4 or a speaker.

According to an embodiment, the input module 153 may receive or detect a user input. For example, the input module 153 may receive or detect a user input for setting a scenario through the UI platform. When receiving or detecting the user input, the input module 153 may output a signal corresponding to the user input.

The memory 157 may be a volatile memory (e.g., a RAM or the like), a nonvolatile memory (e.g., a ROM, a flash memory, or the like), or a combination thereof. The memory 157 may store instructions or data associated with at least one other element(s) of the other electronic device 150. According to an embodiment, the memory 157 may store a UI platform depending on instructions of the processor 159. The memory 157 may further store scenario information set through a user input.

The processor 159 may include at least one of, for example, a CPU, a GPU, a microprocessor, an application processor, an ASIC, or FPGA and may have a plurality of cores. The processor 159 may execute an arithmetic operation or data processing associated with control and/or communication of at least one other component(s) of the other electronic device 150. According to an embodiment, the processor 159 may display a UI platform received from the IoT server 140 on the output module 155. When verifying scenario information set by a user through the UI platform, the processor 159 may store the verified scenario information in the memory 157 and may transmit the verified scenario information to the IoT server 140. The user input may be for setting a state to be monitored for the external electronic device 120 or setting at least some IoT devices to be controlled in response to the state to be monitored.

Figure 6:
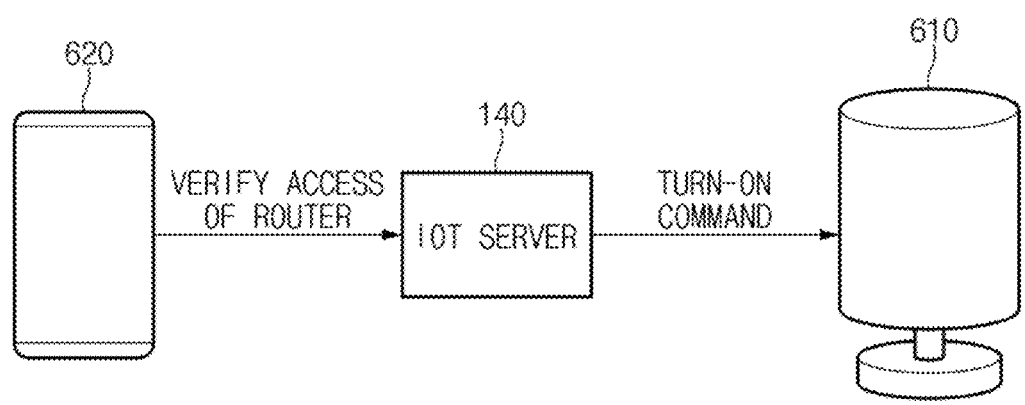
FIG. 6 illustrates an operation method of a server device according to an embodiment.
Figure 7:
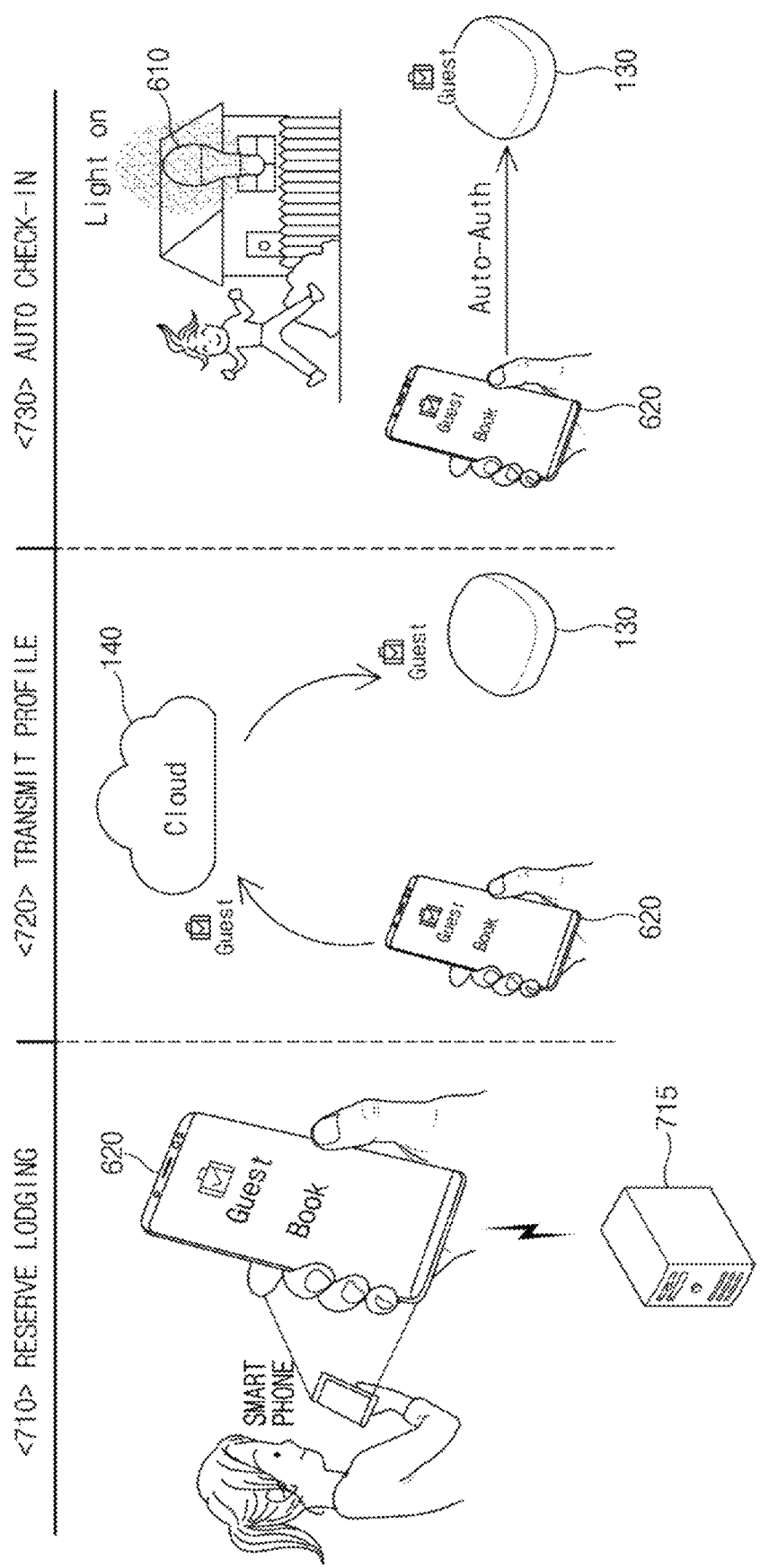
FIG. 7 illustrates an operation method of a server device according to an embodiment.
Figure 8:
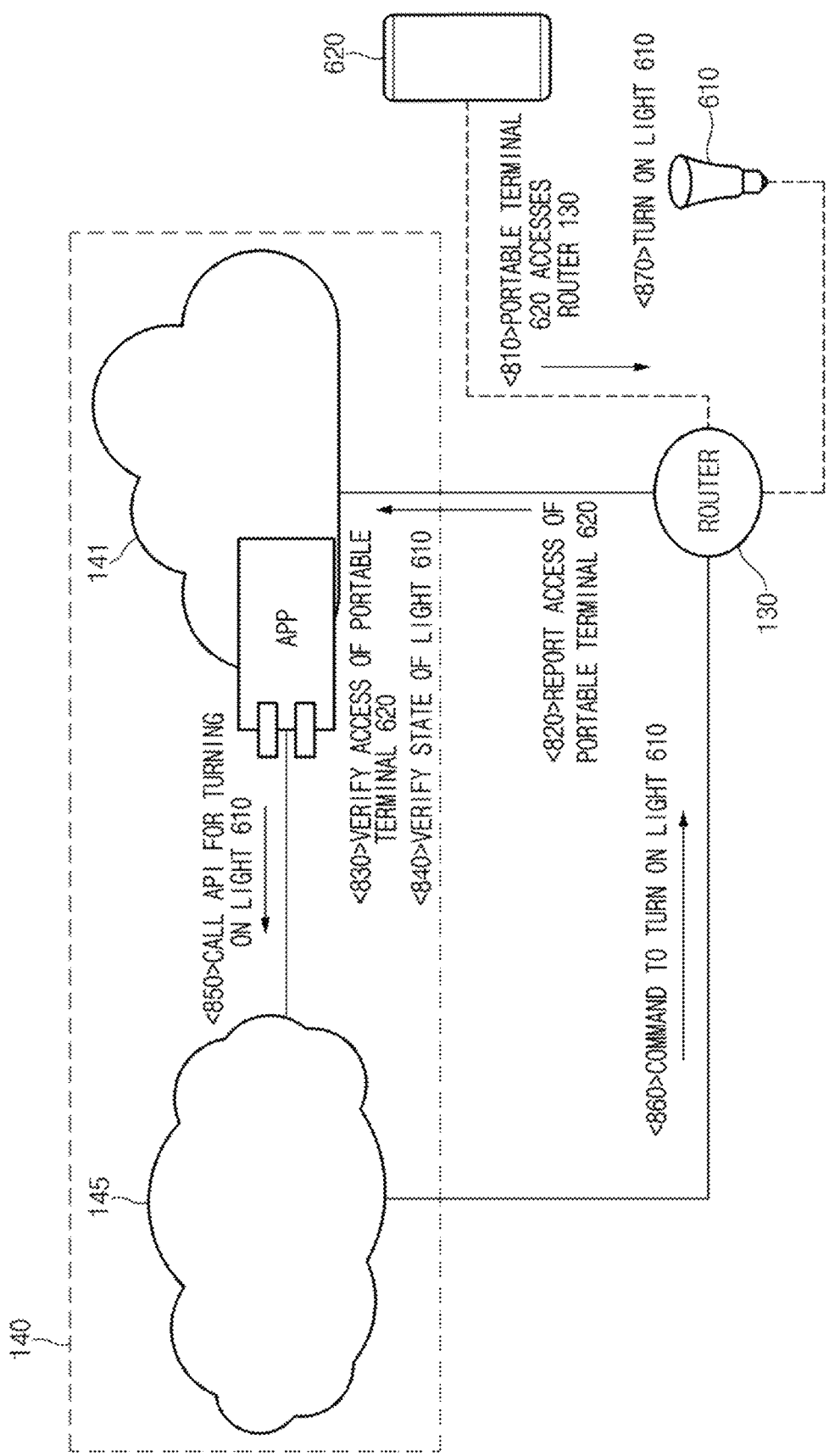
FIG. 8 illustrates an operation method of a server device according to an embodiment.

FIG. 6 illustrates an operation method of a server device according to an embodiment. In particular, FIG. 6 is a drawing illustrating an operation method of a server device according to scenario A according to an embodiment. In FIGS. 6 to 8, an embodiment is exemplified as an electronic device (e.g., an external electronic device 120 of FIG. 1) is a portable terminal 620 and as an IoT device (e.g., an IoT device 110 of FIG. 1) is a light 610. When the specified portable terminal 620 accesses a specified router (e.g., a router 130 of FIG. 1), scenario A may be for turning on the specified light 610.

Referring to FIG. 6, according to an embodiment, an IoT server 140 may verify whether the portable terminal 620 accesses a router (e.g., the router 130 of FIG. 1). For example, when receiving information associated with the portable terminal 620 (e.g., information about access or non-access of the portable terminal 620) through the router 130, the IoT server 140 may verify that the portable terminal 620 is in a turn-on state where the portable terminal 620 accesses the router 130 and may verify that a scenario corresponding to the turn-on state of the portable terminal 620 is scenario A of turning on the light 610.

The IoT server 140 may transmit a turn-on command corresponding to scenario A to the light 610 corresponding to scenario A depending on scenario A. Before transmitting the turn-on command to the light 610, the IoT server 140 may verify whether the light 610 is turned on. When the light 610 is not turned on, the IoT server 140 may transmit the turn-on command to the light 610. The light 610 may receive the turn-on command from the IoT server 140 through the router 130 and may turn on its power supply depending to the turn-on command.

FIG. 7 illustrates an operation method of a server device according to an embodiment. In particular, FIG. 7 is a drawing illustrating an operation method of a server device according to scenario B according to an embodiment.

Referring to FIG. 7, in operation 710, a portable terminal 620 may communicate with a service server 715 depending on a user input to reserve specified lodging by a user. The service server 715 may be, for example, a server which operates itself at the lodging or a server of a provider which acts as a proxy in a lodging reservation service. When the loading is reserved through the portable terminal 620, the service server 715 may transmit identification information of the portable terminal 620 to an IoT server 140.

In operation 720, the IoT server 140 may provide profile information for accessing a router 130 to the portable terminal 620. Alternatively, when the service server 715 stores profile information, the portable terminal 620 may receive the profile information from the service server 715.

In operation 730, when verifying that the portable terminal 620 accesses the router 130, the IoT server 140 may provide an auto check-in service for the specified lodging. The auto check-in service may include, for example, a service of turning on a light 610 located in the specified lodging. The auto check-in service may include, for example, a function of automatically driving another IoT device 110 (e.g., a ventilator, a heating and cooling device, or the like) located in the specified lodging other than the light 610.

In FIG. 7, when there are a plurality of rooms in the lodging, the IoT server 140 may verify information about a room where the portable terminal 620 is located using a plurality of routers. When the portable terminal 620 is located in a reserved room, the IoT server 140 may provide the auto check-in service.

In FIG. 7, an embodiment is exemplified as, when a specified external electronic device 120 accesses the router 130 of the specified lodging, the IoT server 140 is operated to control the specified IoT device 110. However, embodiments are not limited thereto. For example, irrespective of whether the external electronic device 120 is specified, when there is the external electronic device 120 which accesses the specified router 130 on an open space, the IoT server 140 may be operated to control the specified IoT device 110.

FIG. 8 illustrates an operation method of a server device according to an embodiment. In particular, FIG. 8 is a drawing illustrating an operation method of a server device according to scenario B according to an embodiment. FIG. 8 is one example of an auto check-in service described above with reference to FIG. 7.

Referring to FIG. 8, in operation 810, as a portable terminal 620 is close to a router 130, it may search for an identifier (ID) (e.g., a service set ID (SSID)) of the router 130 and may access the router 130 using a password of the router 130, stored in a memory of the portable terminal 620. The password of the router 130 may be stored in a lodging reservation stage.

When the portable terminal 620 accesses the router 130, in operation 820, the router 130 may report the access of the portable terminal 620 to an IoT server 140. For example, when the portable terminal 620 accesses the router 130, the router 130 may transmit information associated with the portable terminal 620 to the IoT server 140. The information associated with the portable terminal 620 may include, for example, identification information of the portable terminal 620, information about access time of the portable terminal 620, and the like.

In operation 830, when receiving the information associated with the portable terminal 620, transmitted from the router 130, the IoT server 140 may verify that the portable terminal 620 accesses the router 130 and may verify the identification information of the portable terminal 620 in the information associated with the portable terminal 620, thus selecting scenario information (e.g., scenario B) corresponding to the identification information of the verified portable terminal 620 from a memory (e.g., a memory 157 of FIG. 5). Scenario B may be to drive various IoT devices (e.g., an IoT device 110 of FIG. 1) (e.g., a light, a heating and cooling device, and the like) installed in lodging when the portable terminal 620 accesses the router 130.

In operation 840, the IoT server 140 may verify a state of a light 610 corresponding to scenario B depending on scenario B. For example, the IoT server 140 may verify whether the light 610 in a turn-on state or a turn-off state.

In operation 850, the IoT server 140 may call an application program interface (API) for turning on the light 610 from a memory (e.g., a memory 143 of FIG. 3).

In operation 860, the IoT server 140 may transmit a turn-on command to the light 610 using the called API.

In operation 870, the light 610 is turned on based on the received turn-on command.

In FIG. 8, an embodiment is exemplified as the portable terminal 620 knows the profile (the ID and the password) of the router 130. However, embodiments are not limited thereto. For example, before the portable terminal 620 accesses the router 130, for example, in a lodging reservation process, the IoT server 140 may verify the identification information of the portable terminal 620. As the portable terminal 620 which is close to the router 130 transmits the identification information of the portable terminal 620 to the router 130, when verifying the identification information of the portable terminal 620 through the router 130, the IoT server 140 may provide the profile of the router 130 to the portable terminal 620.

Figure 9:
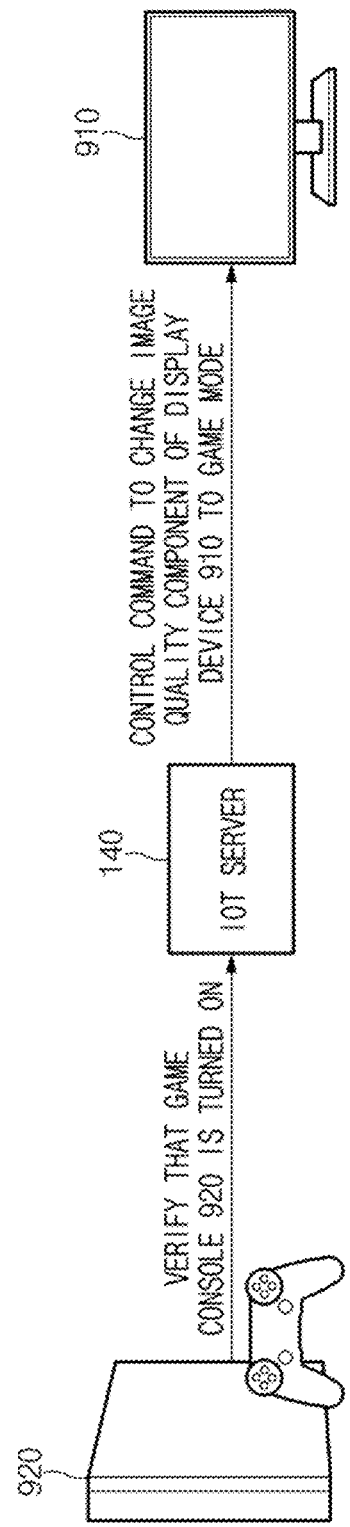
FIG. 9 illustrates an operation method of a server device according to an embodiment.

FIG. 9 illustrates an operation method of a server device according to an embodiment. In particular, FIG. 9 is a drawing illustrating an operation method of a server device according to scenario C according to an embodiment. FIG. 9 illustrates an example in which an electronic device (e.g., an external electronic device 120 of FIG. 1) is a game console 920 and in which an IoT device (e.g., an IoT device 110 of FIG. 1) is a display device 910.

Referring to FIG. 9, according to an embodiment, an IoT server 140 may verify that the game console 920 is turned on using information associated with the game console 920 (e.g., information about data usage of the game console 920, or the like) received from a router (e.g., a router 130 of FIG. 1). The game console 920 may be, for example, a device which is connected and used with the display device 910 and provides an online game. For example, the IoT server 140 may execute scenario C corresponding to a turned-on state of the game console 920 when the game console 920 is in the turned-on state, from the information associated with the game console 920. Scenario C may be to change and set an image quality component of the display device 910 (e.g., an IoT device 110 of FIG. 1) connected with the game console 920 to a game mode when verifying the use of data of the game console 920.

According to an embodiment, the IoT server 140 may transmit a control command to change an image quality component of a display to correspond to a game mode to the display device 910 through the router 130 depending on scenario C. The image quality component may include at least one of, for example, external input settings, resolution, a scanning speed, contrast adjustment, brightness adjustment, or the like. When receiving the control command, the display device 910 may set the image quality component of the display to correspond to the game mode depending on the control command.

Figure 10:
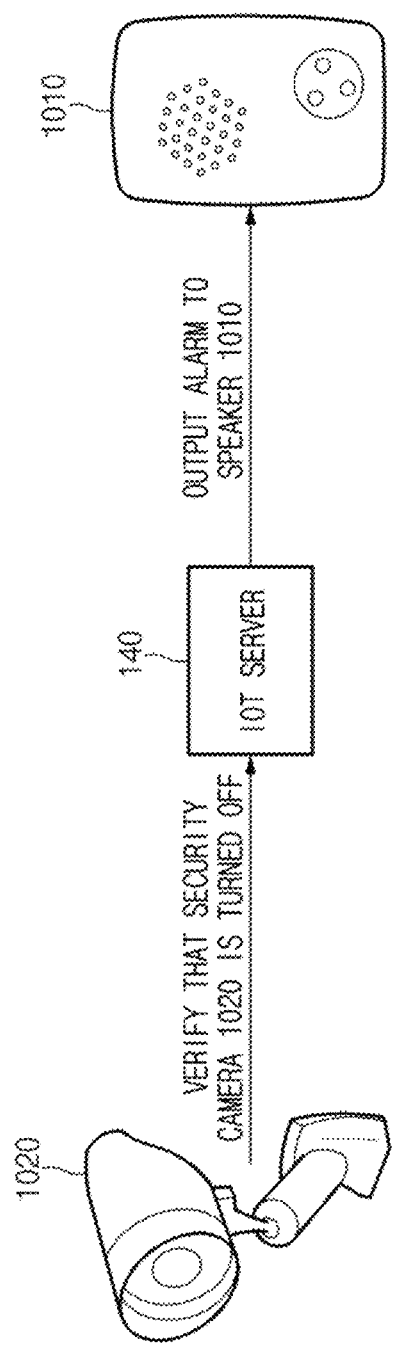
FIG. 10 illustrates an operation method of a server device according to an embodiment.

FIG. 10 illustrates an operation method of a server device according to an embodiment. In particular, FIG. 10 is a drawing illustrating an operation method of a server device according to scenario D according to an embodiment. FIG. 10 illustrates an example in which an electronic device (e.g., an external electronic device 120 of FIG. 1) is a security camera 1020 and in which an IoT device (e.g., IoT device 110 of FIG. 1) is a speaker 1010.

Referring to FIG. 10, according to an embodiment, an IoT server 140 may verify that the security camera 1020 is turned off using information associated with the security camera 1020 (e.g., an access end time or the like of the security camera 1020) received from a router (e.g., a router 130 of FIG. 1). For example, when verifying that the security camera 1020 ends the connection with the router 130 from the information associated with the security camera 1020, the IoT server 140 may verify that the security camera 1020 is turned off. The security camera 1020 may be, for example, a device which transmits a capture image to another device via the router 130. The IoT server 140 may execute scenario D corresponding to a turned-off state of the security camera 1020 based on identification information of the security camera 1020. Scenario D may be to warn of abnormality of the security camera 1020 through the speaker 1010 (e.g., the IoT device 110 of FIG. 1) when verifying that the security camera 1020 is turned off via the router 130.

According to an embodiment, the IoT server 140 may transmit a control command to output an alarm to the speaker 1010 depending on scenario D. When receiving the control command, the speaker 1010 may output the alarm.

In FIG. 10, an embodiment is exemplified as the IoT server 140 transmits the control command to the speaker 1010. However, embodiments are not limited thereto. For example, the IoT server 140 may warn of abnormality of the security camera 1020 through another warning device. For example, the IoT server 140 may transmit a text message for notifying a user of a turned-off state of the security camera 1020 to a portable terminal 620 of the user.

Figure 11:
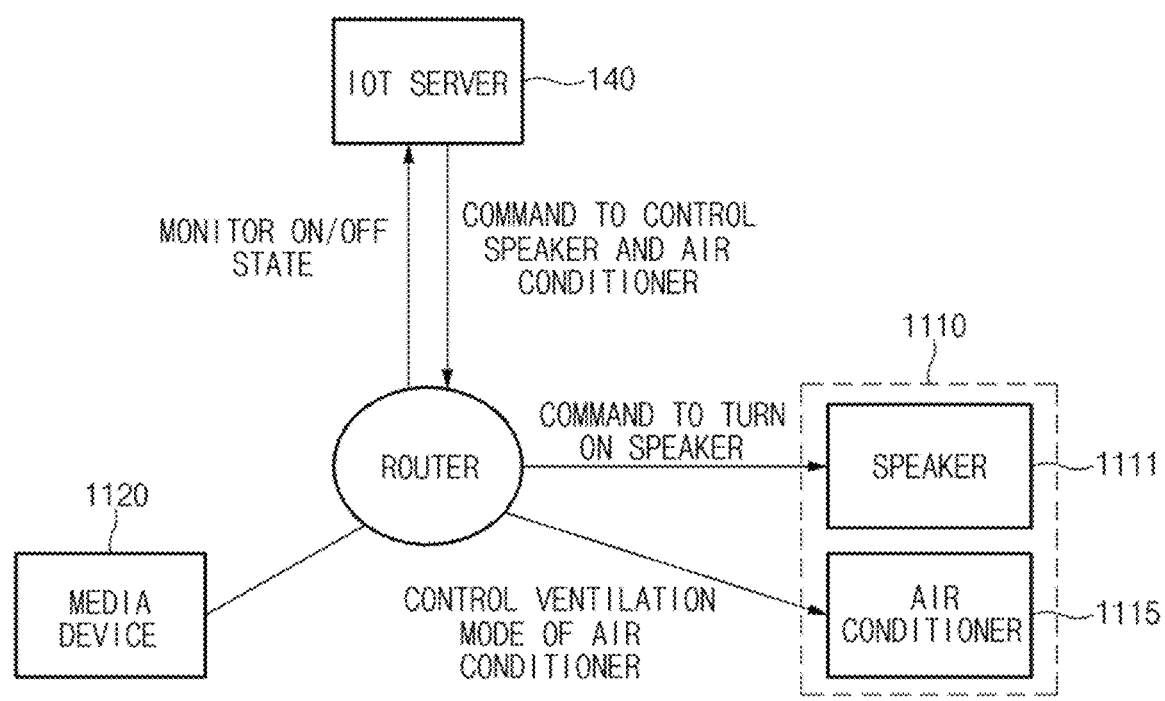
FIG. 11 illustrates an operation method of a server device according to an embodiment.

FIG. 11 illustrates an operation method of a server device according to an embodiment. In particular, FIG. 11 is a drawing illustrating an operation method of a server device according to scenario E according to an embodiment. FIG. 11 illustrates an example in which an electronic device (e.g., an external electronic device 120 of FIG. 1) is a media device 1120 and in which an IoT device (e.g., an IoT device 110 of FIG. 1) is a speaker 1111 and an air conditioner 1115. FIG. 11 illustrates an example of learning a state of each of the media device 1120, the speaker 1111, and the air conditioner 1115, determining a scenario, and controlling the speaker 1111 and the air conditioner 1115 depending on the determined scenario.

Referring to FIG. 11, according to an embodiment, an IoT server 140 may accurate and store information associated with the media device 1120 and may verify a pattern of a state change of each of the speaker 1111 and the air conditioner 1115 according to a state change of the media device 1120 based on the information associated with the media device 1120. The IoT server 140 may determine scenario information corresponding to the verified pattern and may store the determined scenario information in a memory (e.g., a memory 143 of FIG. 3). For example, the IoT server 140 may verify whether there is a device, a state of which is changed between the speaker 1111 and the air conditioner 1115 when the media device 1120 changes from an OFF state to an ON state, using the information associated with the media device 1120. For example, the IoT server 140 may learn that the air conditioner 1115 is driven in a still-air mode after the speaker 1111 is turned on in the ON state of the media device 1120 and after the air conditioner 1115 is turned on. The IoT server 140 may determine a state change of each of the speaker 1111 and the air conditioner 1115 as scenario E in the ON state of the media device 1120 and may store information about the determined scenario E in the memory 143. Scenario E may be updated when there is a change in a pattern of a state change of each of the speaker 1111 and the air conditioner 1115 according to a state of the media device 1120.

When scenario E is determined, the IoT server 140 may monitor a state of the media device 1120 based on the information associated with the media device 1120. When verifying the ON state of the media device 1120, the IoT server 140 may control turn on the speaker 1111 and the air conditioner 1115 depending on scenario E and may control a ventilation mode of the air conditioner 1115 using a still-air mode.

Figure 12:
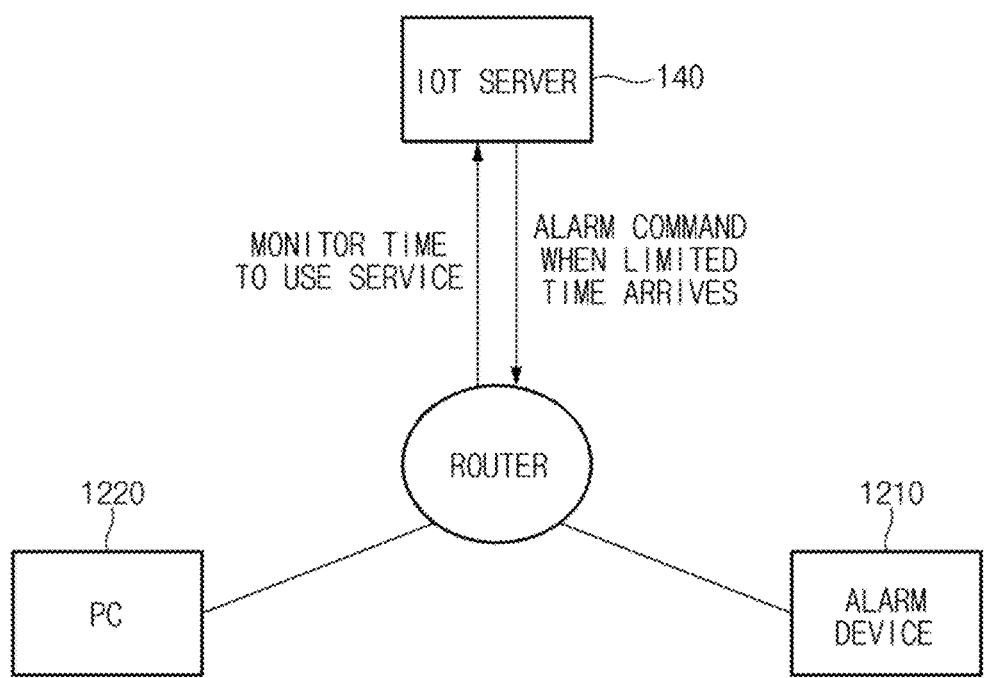
FIG. 12 illustrates an operation method of a server device according to an embodiment.

FIG. 12 illustrates an operation method of a server device according to an embodiment. In particular, FIG. 12 is a drawing illustrating an operation method of a server device according to scenario F according to an embodiment.

Referring to FIG. 12, according to an embodiment, an IoT server 140 may monitor time to use a service of a specified PC 1220 based on PC related information. The specified PC 1220 may be, for example, a PC of a child. When verifying that the PC 1220 is using a specified service (e.g., a game site or an Internet site) using the PC related information, the IoT server 140 may measure time (e.g., total time) to use the specified service. When the total time to use the specified service is greater than or equal to a specified limited time, the IoT server 140 may transmit a control command for an alarm device 1210 (e.g., a speaker) to output a sentence for requesting to limit the time to use the specified service to the alarm device 1210 depending on scenario F. When the alarm device 1210 is the speaker, an alarm may be to output, for example, the voice message "Son, your game time available in a day is over".

Figure 13:
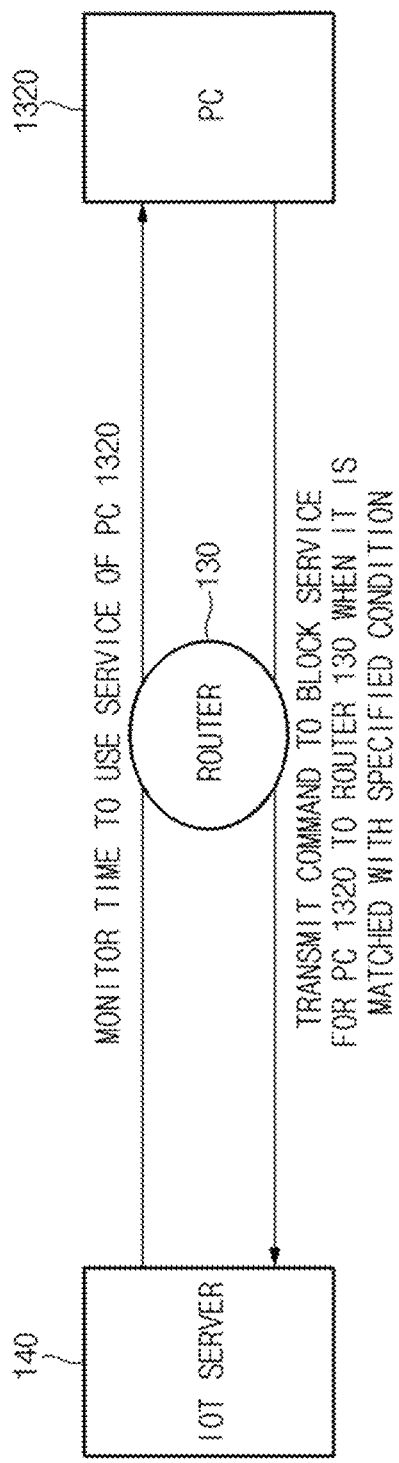
FIG. 13 illustrates an operation method of a server device according to an embodiment.

FIG. 13 illustrates an operation method of a server device according to an embodiment. In particular, FIG. 13 is a drawing illustrating an operation method of a server device according to scenario F' according to an embodiment. Scenario F' may be to limit the use of a service to be stronger than, for example, scenario F.

Referring to FIG. 13, according to an embodiment, an IoT server 140 may monitor time to use a service of a specified PC 1320 via a router 130. The specified PC 1320 may be, for example, a PC of a child. When verifying that the PC 1320 is using a specified service (e.g., a game site or an Internet site) from PC related information, the IoT server 140 may measure time (e.g., the total time) to use the specified service. When the time to use the specified service is greater than or equal to a specified limited time, the IoT server 140 may transmit a control command to block a communication service for the PC 1320 to the router 130. When receiving the control command, the router 130 may block the communication service for the PC 1320. According to an embodiment, the IoT server 140 may indirectly control the PC 1320 via the router 130 as well as directly monitor the PC 1320.

Figure 14:
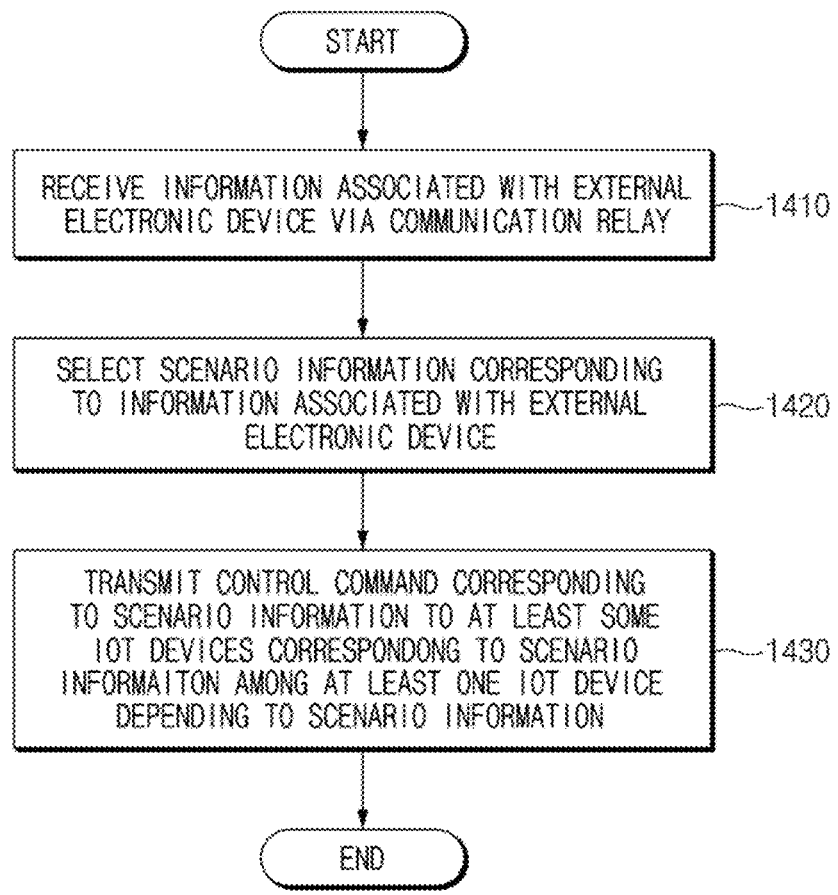
FIG. 14 illustrates a flowchart of an operation method of a server device according to an embodiment.

FIG. 14 illustrates a flowchart of an operation method of a server device according to an embodiment.

Referring to FIG. 14, in operation 1410, a server device (e.g., an IoT server 140 of FIG. 1) may receive information associated with an external electronic device via a communication relay (e.g., a router 130 of FIG. 1).

In operation 1420, the server device (e.g., the IoT server 140 of FIG. 1) may select scenario information corresponding to the received information associated with the external electronic device (e.g., identification information of the external electronic device).

In operation 1430, the server device (e.g., the IoT server 140 of FIG. 1) may transmit a control command corresponding to the scenario information to at least some IoT devices (e.g., a light 610 of FIG. 6) corresponding to the scenario information among at least one IoT device (e.g., an IoT device 110 of FIG. 1) depending on the scenario information.

Figure 15:
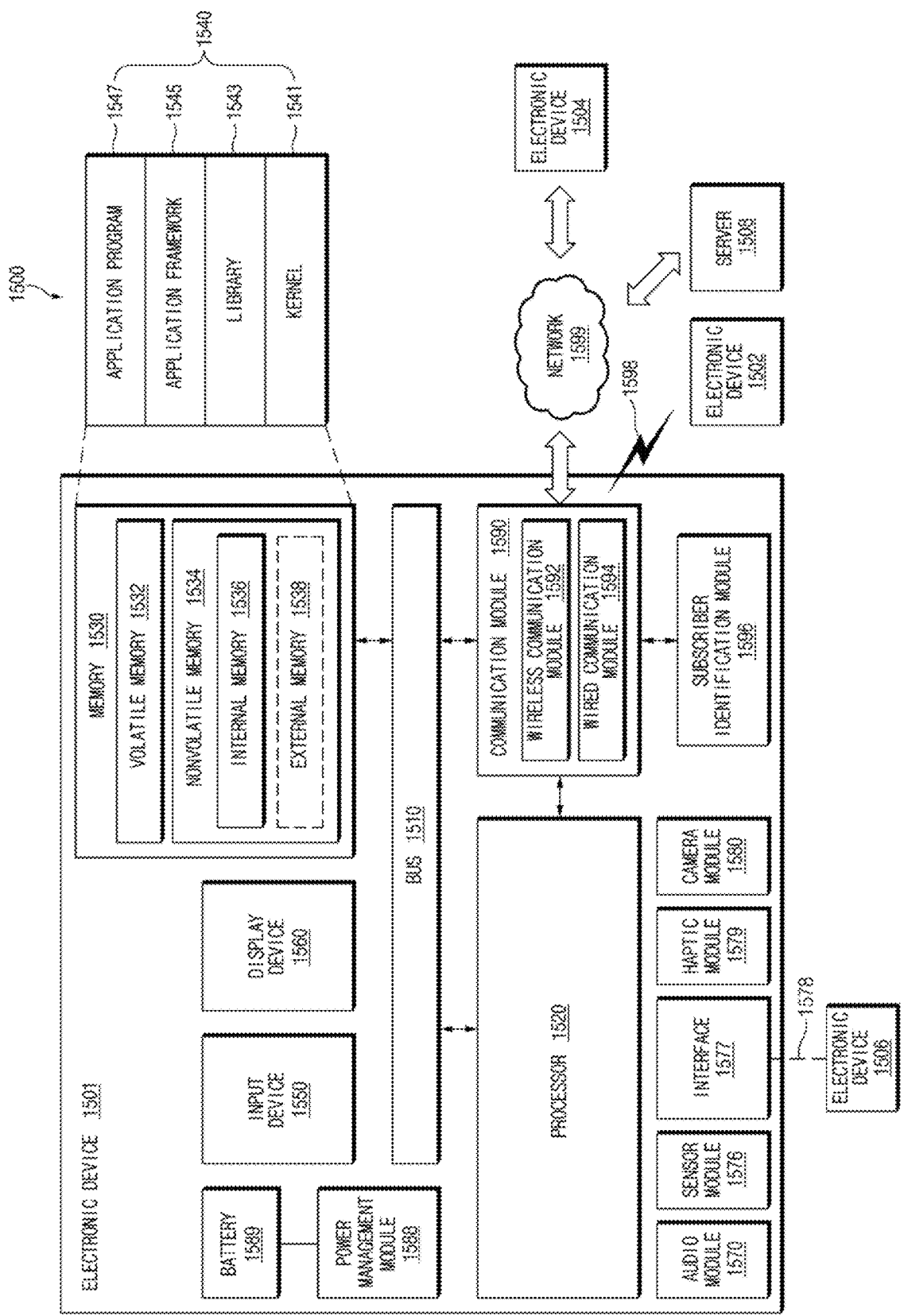
FIG. 15 illustrates a block diagram of an electronic device in a network environment according to various embodiments.

FIG. 15 illustrates a block diagram of an electronic device in a network environment according to various embodiments.

Referring to FIG. 15, an electronic device 1501 (e.g., the IoT Server 140 of FIG. 3) may communicate with an electronic device 1502 through a first network 1598 (e.g., a short-range wireless communication) or may communicate with an electronic device 1504 or a server 1508 through a second network 1599 (e.g., a long-distance wireless communication) in a network environment 1500. According to an embodiment, the electronic device 1501 may communicate with the electronic device 1504 through the server 1508. According to an embodiment, the electronic device 1501 may include a processor 1520 (e.g., the processor 145 of FIG. 3), a memory 1530 (e.g., the memory 143 of FIG. 3), an input device 1550, a sound output device 1555, a display device 1560, an audio module 1570, a sensor module 1576, an interface 1577, a haptic module 1579, a camera module 1580, a power management module 1588, a battery 1589, a communication module 1590 (e.g., the communication module 141 of FIG. 3), a subscriber identification module 1596, and an antenna module 1597. According to some embodiments, at least one (e.g., the display device 1560 or the camera module 1580) among components of the electronic device 1501 may be omitted or other components may be added to the electronic device 1501. According to some embodiments, some components may be integrated and implemented as in the case of the sensor module 1576 (e.g., a fingerprint sensor, an iris sensor, or an illuminance sensor) embedded in the display device 1560 (e.g., a display).

The processor 1520 may operate, for example, software (e.g., a program 1540) to control at least one of other components (e.g., a hardware or software component) of the electronic device 1501 connected to the processor 1520 and may process and compute a variety of data. The processor 1520 may load a command set or data, which is received from other components (e.g., the sensor module 1576 or the communication module 1590), into a volatile memory 1532, may process the loaded command or data, and may store result data into a nonvolatile memory 1534. According to an embodiment, the processor 1520 may include a main processor 1521 (e.g., a central processing unit or an application processor) and an auxiliary processor 1523 (e.g., a graphic processing device, an image signal processor, a sensor hub processor, or a communication processor), which operates independently from the main processor 1521, additionally or alternatively uses less power than the main processor 1521, or is specified to a designated function. In this case, the auxiliary processor 1523 may operate separately from the main processor 1521 or embedded.

In this case, the auxiliary processor 1523 may control, for example, at least some of functions or states associated with at least one component (e.g., the display device 1560, the sensor module 1576, or the communication module 1590) among the components of the electronic device 1501 instead of the main processor 1521 while the main processor 1521 is in an inactive (e.g., sleep) state or together with the main processor 1521 while the main processor 1521 is in an active (e.g., an application execution) state. According to an embodiment, the auxiliary processor 1523 (e.g., the image signal processor or the communication processor) may be implemented as a part of another component (e.g., the camera module 1580 or the communication module 1590) that is functionally related to the auxiliary processor 1523. The memory 1530 may store a variety of data used by at least one component (e.g., the processor 1520 or the sensor module 1576) of the electronic device 1501, for example, software (e.g., the program 1540) and input data or output data with respect to commands associated with the software. The memory 1530 may include the volatile memory 1532 or the nonvolatile memory 1534.

The program 1540 may be stored in the memory 1530 as software and may include, for example, an operating system 1542, a middleware 1544, or an application 1546.

The input device 1550 may be a device for receiving a command or data, which is used for a component (e.g., the processor 1520) of the electronic device 1501, from an outside (e.g., a user) of the electronic device 1501 and may include, for example, a microphone, a mouse, or a keyboard.

The sound output device 1555 may be a device for outputting a sound signal to the outside of the electronic device 1501 and may include, for example, a speaker used for general purposes, such as multimedia play or recordings play, and a receiver used only for receiving calls. According to an embodiment, the receiver and the speaker may be either integrally or separately implemented.

The display device 1560 may be a device for visually presenting information to the user of the electronic device 1501 and may include, for example, a display, a hologram device, or a projector and a control circuit for controlling a corresponding device. According to an embodiment, the display device 1560 may include a touch circuitry or a pressure sensor for measuring an intensity of pressure on the touch.

The audio module 1570 may convert a sound and an electrical signal in dual directions. According to an embodiment, the audio module 1570 may obtain the sound through the input device 1550 or may output the sound through an external electronic device (e.g., the electronic device 1502 (e.g., a speaker or a headphone)) wired or wirelessly connected to the sound output device 1555 or the electronic device 1501.

The sensor module 1576 may generate an electrical signal or a data value corresponding to an operating state (e.g., power or temperature) inside or an environmental state outside the electronic device 1501. The sensor module 1576 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1577 may support a designated protocol wired or wirelessly connected to the external electronic device (e.g., the electronic device 1502). According to an embodiment, the interface 1577 may include, for example, an HDMI (high-definition multimedia interface), a USB (universal serial bus) interface, an SD card interface, or an audio interface.

A connecting terminal 1578 may include a connector that physically connects the electronic device 1501 to the external electronic device (e.g., the electronic device 1502), for example, an HDMI connector, a USB connector, an SD card connector, or an audio connector (e.g., a headphone connector).

The haptic module 1579 may convert an electrical signal to a mechanical stimulation (e.g., vibration or movement) or an electrical stimulation perceived by the user through tactile or kinesthetic sensations. The haptic module 1579 may include, for example, a motor, a piezoelectric element, or an electric stimulator.

The camera module 1580 may shoot a still image or a video image. According to an embodiment, the camera module 1580 may include, for example, at least one lens, an image sensor, an image signal processor, or a flash.

The power management module 1588 may be a module for managing power supplied to the electronic device 1501 and may serve as at least a part of a power management integrated circuit (PMIC).

The battery 1589 may be a device for supplying power to at least one component of the electronic device 1501 and may include, for example, a non-rechargeable (primary) battery, a rechargeable (secondary) battery, or a fuel cell.

The communication module 1590 may establish a wired or wireless communication channel between the electronic device 1501 and the external electronic device (e.g., the electronic device 1502, the electronic device 1504, or the server 1508) and support communication execution through the established communication channel. The communication module 1590 may include at least one communication processor operating independently from the processor 1520 (e.g., the application processor) and supporting the wired communication or the wireless communication. According to an embodiment, the communication module 1590 may include a wireless communication module 1592 (e.g., a cellular communication module, a short-range wireless communication module, or a GNSS (global navigation satellite system) communication module) or a wired communication module 1594 (e.g., an LAN (local area network) communication module or a power line communication module) and may communicate with the external electronic device using a corresponding communication module among them through the first network 1598 (e.g., the short-range communication network such as a Bluetooth, a WiFi direct, or an IrDA (infrared data association)) or the second network 1599 (e.g., the long-distance wireless communication network such as a cellular network, an internet, or a computer network (e.g., LAN or WAN)). The above-mentioned various communication modules 1590 may be implemented into one chip or into separate chips, respectively.

According to an embodiment, the wireless communication module 1592 may identify and authenticate the electronic device 1501 using user information stored in the subscriber identification module 1596 in the communication network.

The antenna module 1597 may include one or more antennas to transmit or receive the signal or power to or from an external source. According to an embodiment, the communication module 1590 (e.g., the wireless communication module 1592) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1501 and the external electronic device 1504 through the server 1508 connected to the second network 1599. Each of the electronic devices 1502 and 1504 may be the same or different types as or from the electronic device 1501. According to an embodiment, all or some of the operations performed by the electronic device 1501 may be performed by another electronic device or a plurality of external electronic devices. When the electronic device 1501 performs some functions or services automatically or by request, the electronic device 1501 may request the external electronic device to perform at least some of the functions related to the functions or services, in addition to or instead of performing the functions or services by itself. The external electronic device receiving the request may carry out the requested function or the additional function and transmit the result to the electronic device 1501. The electronic device 1501 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1540) including an instruction stored in a machine-readable storage media (e.g., an internal memory 1536 or an external memory 1538) readable by a machine (e.g., a computer). The machine may be a device that calls the instruction from the machine-readable storage media and operates depending on the called instruction and may include the electronic device (e.g., the electronic device 1501). When the instruction is executed by the processor (e.g., the processor 1520), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a PLAY STORE). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   a communication module configured to communicate with a communication relay;
   a memory configured to:
      store registration information of at least one registered Internet of things (IoT) device, and
      store scenario information for an operation of the at least one registered IoT device which is associated with identification information of an unregistered external electronic device; and
   a processor operably connected with the communication module and the memory, wherein the processor is configured to:
      obtain the identification information of the unregistered external electronic device via the communication module, associate the obtained identification information of the unregistered external electronic device with the scenario information, and store the associated scenario information in the memory, before the unregistered external electronic device accesses the communication relay,
      provide a specified information corresponding to the communication relay to the unregistered external electronic device after obtaining the identification information of the unregistered external electronic device,
      receive information associated with the unregistered external electronic device via the communication relay when the unregistered external electronic device accesses the communication relay using the specified information,
      select the scenario information corresponding to the information associated with the unregistered external electronic device, and
      transmit a control command corresponding to the selected scenario information to at least one registered IoT device corresponding to the selected scenario information.

2. The electronic device of claim 1, wherein the information associated with the unregistered external electronic device comprises at least one of:
   identification information of the unregistered external electronic device;
   information about access or non-access of the unregistered external electronic device;
   information about an access time of the unregistered external electronic device;
   information about data usage of the unregistered external electronic device;
   information about a data type of the unregistered external electronic device;
   information about a service that is in use by the unregistered external electronic device;
   information about a space where the unregistered external electronic device is located; or
   information about a communication pattern of the unregistered external electronic device.

3. The electronic device of claim 1, wherein the processor is further configured to:
   determine a state of the unregistered external electronic device based on the information associated with the unregistered external electronic device; and
   select the scenario information corresponding to the state of the unregistered external electronic device.

4. The electronic device of claim 1, wherein the scenario information comprises at least one of:
   information of the at least one registered IoT device to be controlled; or
   the control command to be transmitted to the at least one registered IoT device.

5. The electronic device of claim 1, wherein the processor is further configured to:
   provide a user interface (UI) for setting the scenario information to the unregistered external electronic device via the communication module; and
   store the scenario information set through the UI in the memory.

6. The electronic device of claim 1, wherein the processor is further configured to:
when verifying that the unregistered external electronic device accesses the communication relay using the information associated with the unregistered external electronic device, transmit the control command to turn on the at least one registered IoT device depending on the scenario information.

7. The electronic device of claim 1, wherein the unregistered external electronic device comprises a game console,
wherein the at least one registered IoT device comprises a display device, and
wherein the processor is further configured to:
when the game console is connected, transmit the control command to change an image quality component of the display device to the display device depending on the scenario information.

8. The electronic device of claim 1, wherein the unregistered external electronic device comprises a monitoring device that uses a continuous connection to the communication relay,
wherein the at least one registered IoT device comprises an output device, and
wherein the processor is further configured to:
when the monitoring device ends the continuous connection with the communication relay, transmit the control command to warn of abnormality of the monitoring device to the output device depending on the scenario information.

9. The electronic device of claim 1, wherein the processor is further configured to:
accumulate and store the information associated with the unregistered external electronic device;
verify a pattern of a state change of the at least one registered IoT device according to a state change of the unregistered external electronic device based on the information associated with the unregistered external electronic device; and
determine the scenario information corresponding to the verified pattern and store the determined scenario information in the memory.

10. The electronic device of claim 1, wherein the processor is further configured to:
verify a time to use a specified online service of the unregistered external electronic device; and
when the time to use the specified online service is greater than or equal to a specified limited time, transmit the control command for the at least one registered IoT device to output a sentence for requesting to limit the use of the specified online service to the at least one registered IoT device depending on the scenario information.

11. The electronic device of claim 1, wherein the processor is further configured to:
verify a time to use a specified online service of the unregistered external electronic device; and
when the time to use the specified online service is greater than or equal to a specified limited time, transmit the control command to limit the use of a communication network for the unregistered external electronic device or the at least one registered IoT device to the communication relay depending on the scenario information.

12. An operation method of an electronic device, the method comprising:
receiving, by a communication module, identification information of an unregistered external electronic device;
associating the received identification information of the unregistered external electronic device with scenario information for an operation of at least one registered IoT device;
storing registration information of the at least one registered IoT device and the associated scenario information in a memory of the electronic device before the unregistered external electronic device accesses a communication relay;
providing a specified information corresponding to the communication relay to the unregistered external electronic device after obtaining the identification information of the unregistered external electronic device;
receiving information associated with the unregistered external electronic device via the communication relay when the unregistered external electronic device accesses the communication relay using the specified information;
selecting the scenario information corresponding to the information associated with the unregistered external electronic device; and
transmitting a control command corresponding to the selected scenario information to at least one registered IoT device corresponding to the selected scenario information.

13. The method of claim 12, wherein the information associated with the unregistered external electronic device comprises at least one of:
identification information of the unregistered external electronic device;
information about access or non-access of the unregistered external electronic device;
information about an access time of the unregistered external electronic device;
information about data usage of the unregistered external electronic device;
information about a data type of the unregistered external electronic device;
information about a service that is in use by the unregistered external electronic device;
information about a space where the unregistered external electronic device is located; or
information about a communication pattern of the unregistered external electronic device.

14. The method of claim 12, wherein the scenario information comprises at least one of:
information of the at least one registered IoT device to be controlled; or
the control command to be transmitted to the at least one registered IoT device.

15. The method of claim 12, further comprising:
providing a UI for setting the scenario information to the unregistered external electronic device; and
storing the scenario information set through the UI.

16. The method of claim 12, wherein the selecting comprises:
determining a state of the unregistered external electronic device based on the information associated with the unregistered external electronic device; and
selecting the scenario information corresponding to the state of the unregistered external electronic device.

17. The method of claim 12, further comprising:
accumulating and storing a state of the unregistered external electronic device based on the information associated with the unregistered external electronic device;
verifying a pattern of a state change of the at least one registered IoT device according to a state change of the unregistered external electronic device based on the information associated with the unregistered external electronic device; and
determining the scenario information corresponding to the verified pattern and storing the determined scenario information.

18. The method of claim 12, further comprising:
verifying a time to use a specified online service of the unregistered external electronic device; and
verifying whether the time to use the specified online service is greater than or equal to a specified limited time,
wherein the transmitting the control command comprises, when the time to use the specified online service is greater than or equal to the specified limited time, transmitting the control command to limit the use of a communication network for the unregistered external electronic device or the at least one registered IoT device to the communication relay depending on the scenario information.

\* \* \* \* \*